United States Patent [19]

Shay et al.

[11] Patent Number: 4,703,080

[45] Date of Patent: Oct. 27, 1987

[54] AQUEOUS LATICES HAVING IMPROVED COATING RHEOLOGY

[75] Inventors: Gregory D. Shay, Oak Forest; James E. Devona, Mt. Prospect; James E. Kail, Arlington Hgts., all of Ill.

[73] Assignee: DeSoto, Inc., Des Plaines, Ill.

[21] Appl. No.: 728,087

[22] Filed: Apr. 29, 1985

[51] Int. Cl.$^4$ .............................................. C08L 39/00
[52] U.S. Cl. .................................... 524/555; 524/558; 524/813; 524/816; 524/832; 524/833; 526/333
[58] Field of Search ............... 524/816, 832, 833, 555, 524/558, 813; 526/333

[56] References Cited

U.S. PATENT DOCUMENTS

| | | | |
|---|---|---|---|
| 4,351,754 | 9/1982 | Dupré | 524/558 |
| 4,529,773 | 7/1985 | Witiak et al. | 524/558 |

FOREIGN PATENT DOCUMENTS

| | | | |
|---|---|---|---|
| 0013836 | 6/1980 | European Pat. Off. | 526/320 |
| 0109820 | 5/1984 | European Pat. Off. | 526/320 |
| 3319062 | 11/1984 | Fed. Rep. of Germany | 526/320 |
| 0008712 | 1/1984 | Japan | 524/558 |

Primary Examiner—Joseph L. Schofer
Assistant Examiner—J. M. Reddick
Attorney, Agent, or Firm—Dressler, Goldsmith, Shore, Sutker & Milnamow, Ltd.

[57] ABSTRACT

An aqueous emulsion copolymer of monoethylenically unsaturated monomers which provide a copolymer having a glass transition temperature below 20° C., is modified to include from about 0.3% to about 10% of a monoethylenically unsaturated copolymerizable polyether containing a chain of from about 6 to about 150 $C_2$-$C_4$ oxyalkylene groups, the terminal hydroxy group provided by said chain of oxyalkylene groups being capped with a monofunctional hydrophobic group. These polyethers improve the brush drag of paints made with the emulsion copolymers, and in some instances the leveling is simultaneously improved.

15 Claims, No Drawings

AQUEOUS LATICES HAVING IMPROVED COATING RHEOLOGY

TECHNICAL FIELD

This invention relates to aqueous emulsion copolymers which may be included in aqueous air drying latex paints in order to improve the rheology of the paint.

BACKGROUND ART

Aqueous latex paints are in common use, and these paints are frequently applied by brush. It has long been desired to include materials in the paint which will function to improve the brush drag and leveling which are obtained. While reference has been made to paint application by brushing, it will be understood that essentially the same problems effect roller application.

Brush drag is the resistance to motion of the brush as it is drawn across the surface to be painted. Aqueous latex paints are frequently too fluid, and low viscosity paints offer little resistance to brush motion. The result is that the applied coating is too thin, and insufficient paint is applied to cover and hide the surface being painted. Brush drag is improved when the viscosity under the shearing force imposed by the moving brush is increased. With greater brush drag, a greater thickness of paint is applied, and the surface being painted is thus properly covered.

Leveling is the capacity of a paint to flow out and provide a smooth and level surface. When a film of paint is brushed onto a surface with sufficient viscosity to apply a paint layer of proper thickness, the fibers in the brush leave ridges in the applied film. If the paint is too viscous, these ridges remain in the applied film as it dries, and the resulting solid paint film is not smooth and level, as is desired.

As will be evident, one needs increased viscosity to provide adequate brush drag to apply a paint film of proper thickness. At the same time, one needs decreased viscosity in order that the brush marks will flow out and disappear as the applied paint film dries. These apparently opposite characteristics exist under different conditions, the brush drag at high shear and the leveling at low shear. This raises the prospect that both may be improved at the same time.

This invention seeks to provide aqueous latex paints with improved brush drags, especially in combination with improved leveling. These paints can be used to adequately cover a substrate with a single application and will flow out to conceal application irregularities, and this will take place regardless of how the paint is applied, e.g., by brush or by roller.

In the past, extraneous agents were relied upon to provide the desired rheology, to the extent that this was possible with those agents. These post-add rheology modifiers are expensive and introduce ancillary problems of incompatibility, separation, and lack of color acceptance. It would be helpful if the desired rheology characteristics could be incorporated into the aqueous emulsion copolymer which is employed as the resin binder component of the latex paint, and this is an objective of this invention.

DISCLOSURE OF INVENTION

In accordance with this invention, an aqueous emulsion copolymer is prepared by the copolymerization in aqueous emulsion of monoethylenically unsaturated monomers which provide a copolymer having a glass transition temperature below 20° C., preferably below 5° C. and which include from about 0.3% to about 10%, preferably from 1.0% to 5%, of a monoethylenically unsaturated copolymerizable polyether containing a chain of from about 6 to about 150 $C_2$–$C_4$ oxyalkylene groups, preferably from 10 to 100 oxyethylene groups, the terminal hydroxy group provided by said chain of oxyalkylene groups being capped with a monofunctional hydrophobic group.

The chain of oxyalkylene groups can be coupled to the monoethylenic group in any desired fashion, preferably by a carbonyl group.

The copolymers which are modified herein provide a continuous film and are well known. These are usually copolymers of methyl methacrylate with enough ethyl acrylate to provide the desired glass transition temperature, or of vinyl acetate with enough lower alkyl acrylate or methacrylate to provide the desired glass transition temperature, such as n-butyl acrylate or methacrylate, or of vinyl acetate with enough ethylene to provide the desired glass transition temperature. Other useful co-monomers such as styrene, alkyl maleates, alkyl fumarates, and esters of versatic acid may also be used.

These copolymers may include 0.1% to 5.0% of ureido monomers to enhance wet adhesion properties as well as small amounts of hydroxy or carboxy monomers to assist copolymerization and to enhance adhesion. The ureido monomers are well known and are illustrated in U.S. Pat. Nos. 4,487,941, 4,319,032. Similar adhesion promoters are shown in U.S. Pat. Nos. 3,356,653 and 3,509,085.

These copolymers, except for the inclusion of the hydrophobic terminated monoethylenically unsaturated copolymerizable polyethers which have been described, are entirely conventional. Similarly, the copolymerization in aqueous emulsion is also conventional.

The monoethylenically unsaturated portion of the copolymerizable polyether is subject to wide variation, but it is preferred to use a terminal ethylenic group, as is supplied by the acrylic or methacrylic group. Thus, hydroxyethyl methacrylate, or similar hydroxy-functional acrylate or methacrylate is reacted with as many molar proportions of ethylene oxide as is desired to produce the desired oxyethylene chain. The ethylene oxide can be replaced by propylene oxide or butylene oxide, or any desired mixture of these oxides. The polyether is then reacted with a hydrophobic molecule carrying a single reactive group which will react with the hydroxy group on the oxyalkylene chain, and this introduces a hydrophobic group on the end of the monomer molecule remote from its unsaturation.

The hydrophobic molecule can be any long chain aliphatic or aromatic group, preferably a $C_6$–$C_{30}$ hydrocarbon group carrying a single hydroxy-reactive group. These hydroxy-reactive groups are illustrated by hydroxy (to form an ether), carboxy (to form an ester) or isocyanate (to form a urethane). Typical compounds which are useful are dodecyl alcohol, octyl or nonyl phenol, palmitic acid, and octyl monoisocyanate. The reactions of these with the hydroxy group is conventional.

Another linking group which is quite useful herein has the formula:

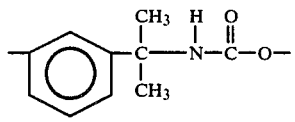

Throughout this application, all parts and proportions are by weight, unless otherwise stated. The invention is illustrated as follows.

EXAMPLE 8

To a 5 liter flask equipped with stirrer, condenser, nitrogen inlet, temperature controlled water bath, and monomer emulsion addition pump, were charged 785.6 grams of deionized water. The water bath was heated to 80° C. to provide a reactor temperature of 72.5° C.

A monomer pre-emulsion was prepared by charging to a separate container with stirring 1089.2 grams of deionized water, 57.3 grams of the sodium salt of the sulfonate of a 3 mole ethoxylate of octyl phenol (Triton X-200 supplied by Rohm and Haas, Philadelphia, PA may be used), 36.7 grams of a 70 mole ethoxylate of octyl phenol (Siponic F-707 supplied by American Alcolac Company, Baltimore, MD may be used), 799.6 gram of butyl acrylate, 692.6 grams of methyl methacrylate, 43.4 grams of 2-hydroxyethyl acrylate, 24.1 grams of acrylic acid, 40.2 grams of a ureido monomer providing wet adhesion properties (the ureido monomer provided in the single Example of U.S. Pat. No. 4,487,941 may be used), 11.99 grams of ethoxylated monomer described in note 1, 2.41 grams of ammonium persulfate and 8.9 grams of aqueous ammonia.

4.82 grams of ammonium persulfate was charged to the reactor and the monomer pre-emulsion was added continuously over a period of 4 hours. One half hour after the addition of pre-emulsion was complete, the contents of the reactor were cooled and discharged.

The product was an aqueous latex having a solids content of 43.6%, a minimum film-forming temperature of 3.5° C., a particle size of 740 nm, a pH of 5.05 and a Brookfield viscosity of 76 centipoises.

Note 1. The ethoxylated monomer was a polyethoxylate of 2-hydroxyethyl methacrylate containing about 25 oxyethylene groups per molecule, the terminal hydroxy group of the oxyethylene chain being etherified with lauryl alcohol. The commercial product Sipomer LEM-25 provided by American Alcolac Company of Baltimore, MD, may be used.

The invention is demonstrated in the data which is tabulated below. In this tabulation, all of the copolymers are the same as in Example 8 set forth above, except that the linking agents in Examples 2-7 have the formulae set forth previously. In each instance, the number of oxyethylene groups is set forth, the hydrophobic group is designated either NP to denote nonyl phenol or, where an alcohol is used as in Example 8, its chain length is set forth. The concentration of the polyether monomer is then identified and the results are reported by giving the brush drag and the leveling, both in poises. It will be understood that for brush drag on desires to have a high value, whereas for leveling one needs a low value.

The values for brush drag and leveling are measured on a series of conventional semi-gloss white paints having a resin solids content of 27.3% by volume, a pigment to binder weight ratio of 1:4, titanium dioxide, rutile, in a pigment volume concentration of 19.3%, and thickened with cellulosic thickener to provide the paints tested with a viscosity in the range of from 88-95 Krebs units.

TABLE

| Ex. | Chain Length | End group | Conc.[1] | Brush Drag[2] | Leveling[2] |
| --- | --- | --- | --- | --- | --- |
| 1 | None | None | None | 0.55 | 4235 |
| 2 | 9 | NP | 0.75% | 0.75 | 5160 |
| 3 | 15 | NP | 0.75% | 1.00 | 6360 |
| 4 | 15 | NP | 0.75% | 2.43 | 7695 |
| 5 | 100 | NP | 0.75% | 1.95 | 8695 |
| 6 | 15 | NP | 2.00% | 0.84 | 3435 |
| 7 | 30 | $C_{16}$–$C_{18}$ | 0.75% | 1.58 | 7545 |
| 8 | 25 | $C_{12}$ | 0.75% | 2.36 | 3550 |

[1] Concentration indicates the percent of polyethylenic monomer based on total monomer.
[2] the brush drag is measured at a shear rate of about 10,000 reciprocal seconds, while the leveling is measured at a shear rate of about 1 reciprocal second. These measurements can be made on a Haake Rotovisco viscometer. As can be seen, brush drag is consistently better than the control, and in some instances, the leveling is also better than the control. Thus, in Example 6 and 8, both factors have been improved, and in example 8 the improved brush drag is very favorable and it is achieved usingonly 0.75% of the polyether monomer.

What is claimed is:

1. A latex paint containing, as the resin binder component of said paint, an aqueous emulsion copolymer of monoethylenically unsaturated monomers which provide a copolymer having a glass transition temperature below 20° C., and which include from about 0.3% to about 10% of a monoethylenically unsaturated copolymerizable polyether containing a chain of from about 6 to about 150 $C_2$–$C_4$ oxyalkylene groups, said chain of oxyalkylene groups being linked to a monofunctional hydrophobic group containing a $C_6$ to $C_{30}$ hydrocarbon group, and said monofunctional hydrophobic group being linked to said chain of oxyalkylene groups by means of a group selected from an ether group, an ester group and a urethane group.

2. A paint as recited in claim 1 in which said monomers provide a copolymer having a glass transition temperature below 5° C.

3. A paint as recited in claim 2 in which said monoethylenically unsaturated copolymerizable polyether is present in an amount of from 1.0% to 5% of the copolymer.

4. A paint as recited in claim 1 in which said monoethylenically unsaturated copolymerizable polyether contains oxyethylene groups.

5. A paint as recited in claim 4 in which said monoethylenically unsaturated copolymerizable polyether contains from 10-100 oxyethylene groups and is terminated with a hydrocarbon.

6. A paint as recited in claim 1 in which said chain of oxyalkylene groups is coupled to the monoethylenic group of said polyether by a carbonyl group.

7. A paint as recited in claim 1 in which said chain of oxyalkylene groups is coupled to the monoethylenic group of said polyether by a group having the formula:

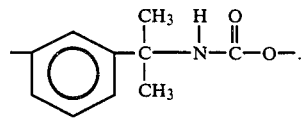

8. A paint as recited in claim 1 in which said monoethylenically unsaturated copolymerizable polyether contains a terminal ethylenic group.

9. A paint as recited in claim 8 in which said terminal ethylenic group is supplied by the acrylic or methacrylic group.

10. A paint as recited in claim 9 in which said terminal ethylenic group is supplied by an hydroxy-functional acrylate or methacrylate.

11. A paint as recited in claim 8 in which said monoethylenically unsaturated copolymerizable polyether is terminated by a $C_6$–$C_{30}$ hydrocarbon group carrying a single hydroxy-reactive group.

12. A paint as recited in claim 8 in which said terminal group is provided as an ether.

13. A paint as recited in claim 8 in which said terminal group is provided as an ester.

14. A paint as recited in claim 8 in which said terminal group is provided as a urethane.

15. A paint as recited in claim 1 in which said paint is an air drying paint.

* * * * *